United States Patent
Wang et al.

(10) Patent No.: US 9,772,723 B2
(45) Date of Patent: Sep. 26, 2017

(54) CAPACITIVE IN-CELL TOUCH PANEL AND DISPLAY DEVICE

(71) Applicant: BEIJING BOE OPTOELECTRONICS TECHNOLOGY CO., LTD., Beijing (CN)

(72) Inventors: Haisheng Wang, Beijing (CN); Xue Dong, Beijing (CN); Yingming Liu, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 546 days.

(21) Appl. No.: 14/103,649

(22) Filed: Dec. 11, 2013

(65) Prior Publication Data

US 2014/0168154 A1    Jun. 19, 2014

(30) Foreign Application Priority Data

Dec. 13, 2012   (CN) .......................... 2012 1 0541455

(51) Int. Cl.
  *G06F 3/045*   (2006.01)
  *G06F 3/044*   (2006.01)
  *G06F 3/041*   (2006.01)

(52) U.S. Cl.
  CPC ............ *G06F 3/044* (2013.01); *G06F 3/0412* (2013.01); *G06F 2203/04103* (2013.01)

(58) Field of Classification Search
  CPC ................... G06F 3/0412; G06F 3/044; G06F 2203/04103

USPC ......................................................... 345/174
See application file for complete search history.

(56) References Cited

U.S. PATENT DOCUMENTS

| | | | | |
|---|---|---|---|---|
| 8,792,062 | B2 * | 7/2014 | Hwang | .................... G06F 3/044 178/18.01 |
| 2010/0059294 | A1 * | 3/2010 | Elias | ...................... G06F 3/0416 178/18.06 |
| 2010/0309167 | A1 | 12/2010 | Nam | |
| 2011/0157039 | A1 * | 6/2011 | Shin | .................... G02F 1/13338 345/173 |
| 2012/0161140 | A1 | 6/2012 | Xue et al. | |
| 2012/0274603 | A1 * | 11/2012 | Kim | ....................... G06F 3/0412 345/174 |

(Continued)

FOREIGN PATENT DOCUMENTS

| CN | 201403089 Y | 2/2010 |
|---|---|---|
| CN | 101825966 A | 9/2010 |

(Continued)

OTHER PUBLICATIONS

First Chinese Office Action dated Apr. 3, 2015: Appln. No. 201210541455.5.

(Continued)

*Primary Examiner* — Kwang-Su Yang
(74) *Attorney, Agent, or Firm* — Ladas & Parry LLP

(57) ABSTRACT

In a capacitive in-cell touch panel and a display device, a common electrode layer electrically connected over the entire surface in a TFT array substrate is partitioned into touch sensing electrodes and touch driving electrodes that are driven in a time-division manner to realize touch function and display function.

20 Claims, 9 Drawing Sheets

(56) References Cited

U.S. PATENT DOCUMENTS

| | | | |
|---|---|---|---|
| 2013/0044074 A1* | 2/2013 | Park | G02F 1/13338 345/174 |
| 2013/0077034 A1* | 3/2013 | Jung | G02F 1/1345 349/122 |
| 2013/0106755 A1 | 5/2013 | Hotelling et al. | |
| 2013/0300953 A1* | 11/2013 | Hotelling | G06F 3/0412 349/12 |
| 2014/0111446 A1* | 4/2014 | Lee | G06F 3/0416 345/173 |
| 2014/0247247 A1 | 9/2014 | Hotelling et al. | |

FOREIGN PATENT DOCUMENTS

| | | |
|---|---|---|
| CN | 101925872 A | 12/2010 |
| CN | 201725120 A | 1/2011 |
| CN | 102314248 A | 1/2012 |
| CN | 102566166 A | 7/2012 |
| CN | 102945106 A | 2/2013 |
| CN | 202976049 U | 6/2013 |

OTHER PUBLICATIONS

Second Chinese Office Action dated Jul. 21, 2015; Appln. No. 201210541455.5.

\* cited by examiner

CAPACITIVE IN-CELL TOUCH PANEL AND DISPLAY DEVICE

CROSS REFERENCE TO RELATED APPLICATIONS

This application claims priority from Chinese National Application No. 201210541455.5 filed on Dec. 13, 2012, the contents of which are incorporated herein by reference.

TECHNICAL FIELD

Embodiments of the present disclosure relate to a capacitive in-cell touch panel and a display device.

BACKGROUND

With the rapid development of technologies, touch screen panels have become popular in people's life. At present, depending on their structure, touch panels can be classified into add-on mode touch panels, on-cell touch panels, in-cell touch panels and so on. An add-on mode touch panel includes a touch panel and a display screen such as a liquid crystal display (LCD) panel that are manufactured separately and then attached together to form the touch screen panel with touch function. Disadvantages of add-on mode touch panels include high manufacturing costs, low light transmission ratio and great module thickness. For an in-cell touch panel, the touch electrodes of the touch panel are embedded inside the liquid crystal display for example, which can reduce the overall thickness of modules and significantly lower manufacturing costs of the touch panels, hence attracting interests of panel manufacturers.

At present, a traditional capacitive in-cell touch panel is implemented by further adding touch driving lines and touch sensing lines directly on an existing thin film field effect transistor (TFT) array substrate, that is, two layers of transparent conducting electrodes (typically strip-like ITO electrodes) intersecting in different planes are manufactured on a surface of the TFT array substrate. These two layers of ITO (indium tin metal oxide) electrodes function as touch driving lines and touch sensing lines of the touch panel respectively and generate inductive capacitance at different-plane intersections of the two ITO electrodes. The operation of this capacitive in-cell touch panel is as follows. When the ITO electrodes functioning as touch driving lines are applied with a touch driving signal, a voltage signal that is coupled out via the inductive capacitance by the touch sensing lines is detected. If a user touches the touch panel during this period, the electric field of the human body acts on the inductive capacitance, causing the capacitance value thereof to change, and thus the voltage signal coupled out by the touch sensing lines is changed. It is possible to determine the positions of contacts depending on the sensed change of the voltage signal.

As for the above-mentioned structure design of the capacitive in-cell touch panel, it is necessary to add a new layer structure on the traditional TFT array substrate, which requires an additional new process in manufacturing TFT array substrate, increasing the production costs and is disadvantageous for improving production efficiency.

SUMMARY

Embodiments of the present disclosure provide a capacitive in-cell touch panel and a display device for realizing a capacitive in-cell touch panel with low costs and high production efficiency.

One aspect of the present disclosure provides a capacitive in-cell touch panel comprising a TFT array substrate having gate signal lines, data signal lines and a common electrode layer, the common electrode layer being over the gate signal lines and the data signal lines, and the TFT array substrate comprising a plurality of pixel units arranged in matrix, wherein the common electrode layer comprises touch sensing electrodes and touch driving electrodes insulated with each other, and partitioning gaps between the touch sensing electrodes and the touch driving electrodes are opposite to gaps between pixel units of adjacent rows and adjacent columns; in a display period, the touch driving electrodes and the touch sensing electrodes are applied with a common electrode signal; and in a touch control period, the touch driving electrodes are applied with a touch scan signal and the touch sensing electrodes are used to couple with and output a voltage signal of the touch scan signal; the TFT array substrate comprises first metal driving electrodes and/or first metal inductive electrodes over the data signal lines and between pixel units of adjacent columns; the first metal driving electrodes are electrically connected with corresponding touch driving electrodes, and the first metal inductive electrodes are electrically connected with corresponding touch sensing electrodes.

Another embodiment of the present disclosure provides a display device including the above-mentioned capacitive in-cell touch panel.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

For better understanding technical proposals according to embodiments of the present disclosure, drawings of the embodiments will be described briefly below. Obviously, drawings in the following description only relate to some embodiments of the present disclosure, not to limit the present disclosure.

DETAILED DESCRIPTION

Figure 1:
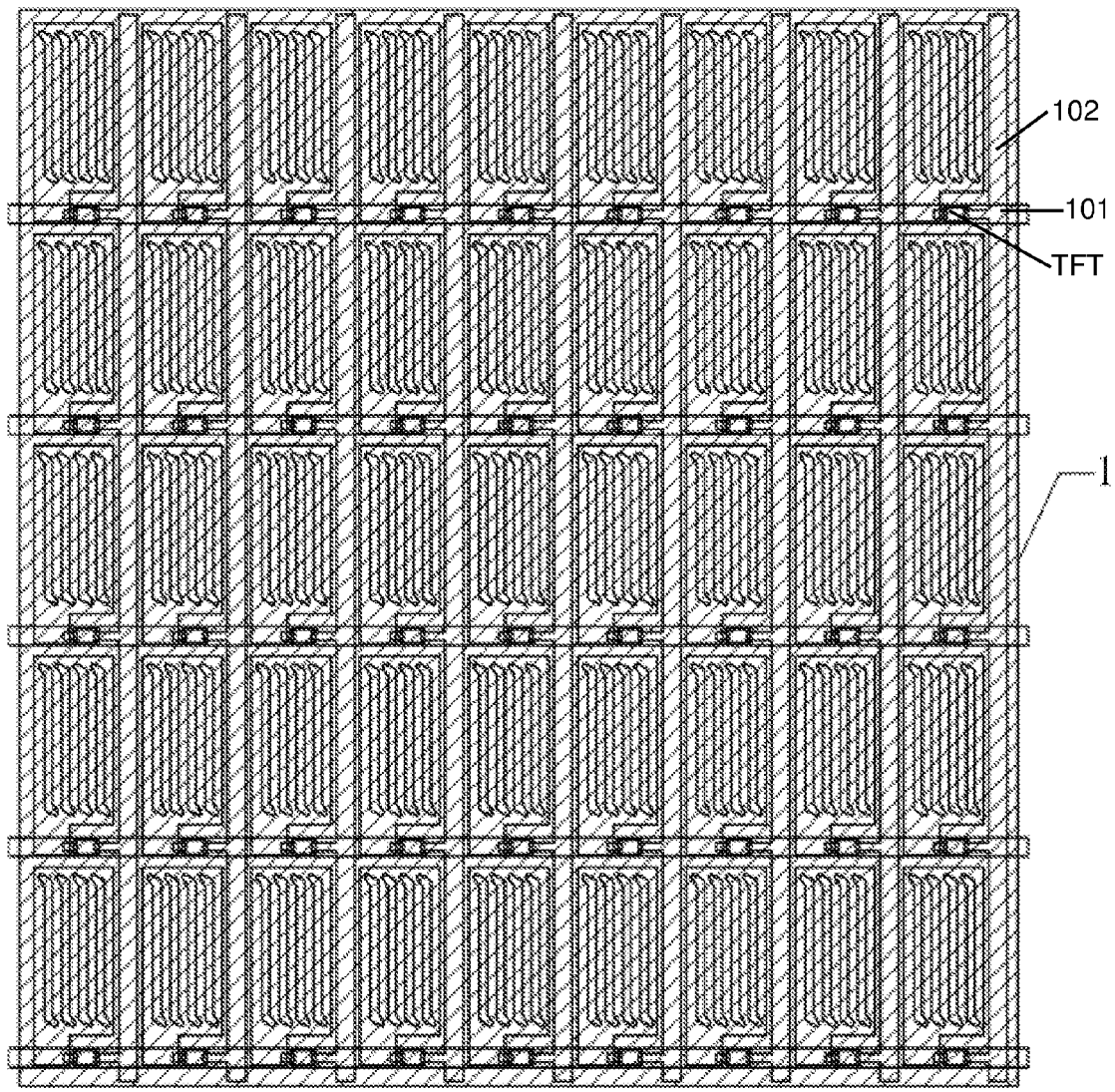
FIG. 1 is a top view of a traditional TFT array substrate.

At present, the liquid crystal display technologies that can realize wide viewing angle mainly include in-plane switch (IPS) technology and advanced super dimension switch (ADSDS or ADS) technology. With the ADS technology, a multidimensional electric field is formed of an electric field generated at edges of slit electrodes in the same plane and an electric field generated between the slit electrode layer and the plate electrode layer, which enables liquid crystal molecules of all orientations between slit electrodes and right above electrodes in the liquid crystal cell to be rotated, thereby improving work efficiency of the liquid crystal and enhancing transmission efficiency. The ADS technology can improve quality of TFT-LCD products and have advantages of high resolution, high transmittance, low power dissipation, wide viewing angle, high aperture ratio, low color difference and no push Mura. H-ADS (high aperture ratio advanced super dimension switch) is an important embodiment of the ADS technology.

Embodiments of the present disclosure propose a new capacitive in-cell touch panel structure based on the ADS technology and the H-ADS technology. Hereinafter, specific examples of the capacitive in-cell touch panel and the display device provided in embodiments of the present disclosure will be described in detail with reference to accompany drawings. The thicknesses and shapes of layers of films in the drawings do not reflect real scale of the TFT array substrate or the color filter substrate and are only for illustratively explain contents of the present disclosure.

Unless otherwise defined, all the technical and scientific terms used herein have the same meanings as commonly understood by one of ordinary skill in the art to which the present disclosure belongs. "On," "under," "right," "left" and the like are only used to indicate relative position relationship, and when the position of the object which is described is changed, the relative position relationship may be changed accordingly.

The capacitive in-cell touch panel provided in an embodiment of the present disclosure may include a TFT array substrate having gate signal lines, data signal lines and common electrode layer above the gate signal lines and the data signal lines, and in the TFT array substrate a plurality of pixel units arranged in matrix are disposed.

The common electrode layer includes touch sensing electrodes and touch driving electrodes insulated with each other, and partitioning gaps between touch sensing electrodes and touch driving electrodes are opposite to gaps between pixel units of adjacent rows and adjacent columns. In the display period, a common electrode signal is applied to the touch driving electrodes and the touch sensing electrodes. In the touch control period, a touch scan signal is applied to the touch driving electrodes and the touch sensing electrodes are used to couple with and output the voltage signal of the touch scan signal.

The TFT array substrate comprises first metal driving electrodes and/or first metal inductive electrodes over data signal lines and between pixel units of adjacent columns. The first metal driving electrodes and corresponding touch driving electrodes are connected electrically, and the first metal inductive electrodes and corresponding touch sensing electrodes are connected electrically.

FIG. 1 illustrates a traditional TFT array substrate. This array substrate includes a plurality of lateral gate signal lines 101 and a plurality of longitudinal data signal lines 102 intersecting each other to define pixel units arranged in matrix. Each pixel unit includes a thin film transistor (TFT) as a switching element and includes a pixel electrode and a common electrode for controlling alignment of liquid crystal. The common electrode is the entire-plane common electrode layer 1 covering a plurality of or all pixel units. For example, the gate of the thin film transistor of each pixel is electrically connected or integrated with respective gate signal lines, the source is electrically connected or integrated with respective data signal lines, and the drain is electrically connected or integrated with respective pixel electrodes.

In the above-mentioned capacitive in-cell touch panel provided in one embodiment of the present disclosure, mutually insulated touch sensing electrodes and touch driving electrodes are formed by partitioning the entire-plane common electrode layer 1 in a traditional TFT array substrate as illustrated in FIG. 1. Partitioning gaps between touch sensing electrodes and touch driving electrodes are opposite to gaps between pixel units of adjacent rows and adjacent columns (namely overlapping each other in a direction perpendicular to the array substrate). The touch panel realizes touch function and display function by driving the touch driving electrodes and the touch sensing electrodes in a time division manner.

Since the touch panel provided in the embodiment of the present disclosure realizes touch control function by modifying common electrode layer structure of a traditional TFT array substrate for example as illustrated in FIG. 1, it may be manufactured on the basis of the manufacturing process of a traditional TFT array substrate without adding any further process. Therefore, the embodiment of the present disclosure saves production costs, enhance production efficiency and can reduce mutual interference and enhance picture quality due to the time-division driving for realizing the touch and display functions.

Hereinafter, an exemplary structure of the common electrode layer of the touch panel according to the above-mentioned embodiment will be described in detail.

For example, the touch sensing electrodes formed with the common electrode layer may be wired along the column direction of pixel units of the TFT array substrate; and the touch driving electrodes may be wired along the row direction of pixel units of the TFT array substrate. Of course, the wiring directions of these electrodes may be changed according to the size of the applied devices, that is, various touch driving electrodes are arranged to extend along the column direction of pixel units, and various touch sensing electrodes are arranged to extend along the row direction of pixel units, which is not limited here.

Hereinafter, description will be made with an example in which the touch driving electrodes extend along the row direction of pixel units and touch sensing electrodes extend along the column direction of pixel units.

In general, the touch precision of a touch panel is generally on the order of millimeter. Densities and widths of touch driving electrodes and touch sensing electrodes may be chosen depending on the required touch precision to ensure the required precision. Typically, widths of touch driving electrodes and touch sensing electrodes are preferably controlled at 5-7 mm. However the display precision of a liquid crystal display is generally on the order of microns, therefore one touch driving electrode and touch sensing electrode will generally cover a plurality rows or a plurality of columns of pixel units of the substrate. The precision referred to in the embodiments of the present disclosure refers to the size of one touch unit or a pixel unit of the display screen of the touch panel.

Figure 2A:
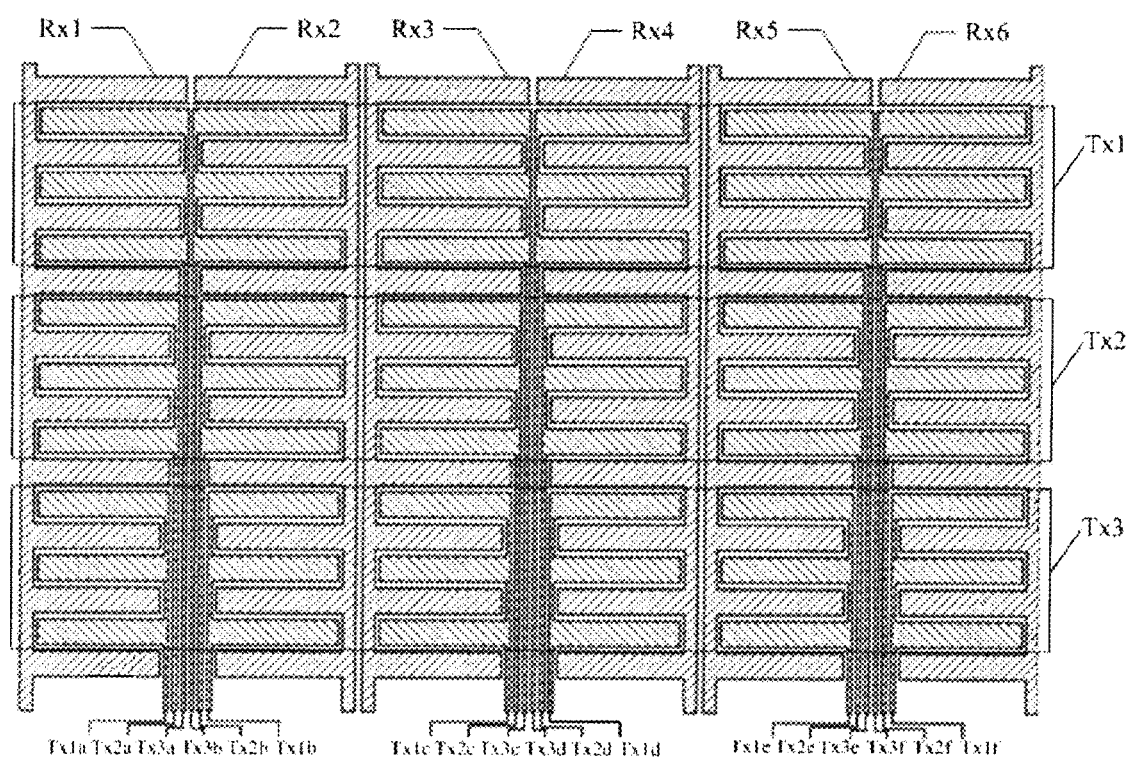
FIGS. 2a and 2b are schematic diagrams of common electrode layer patterns in the touch panel provided in embodiments of the present disclosure.
Figure 2B:
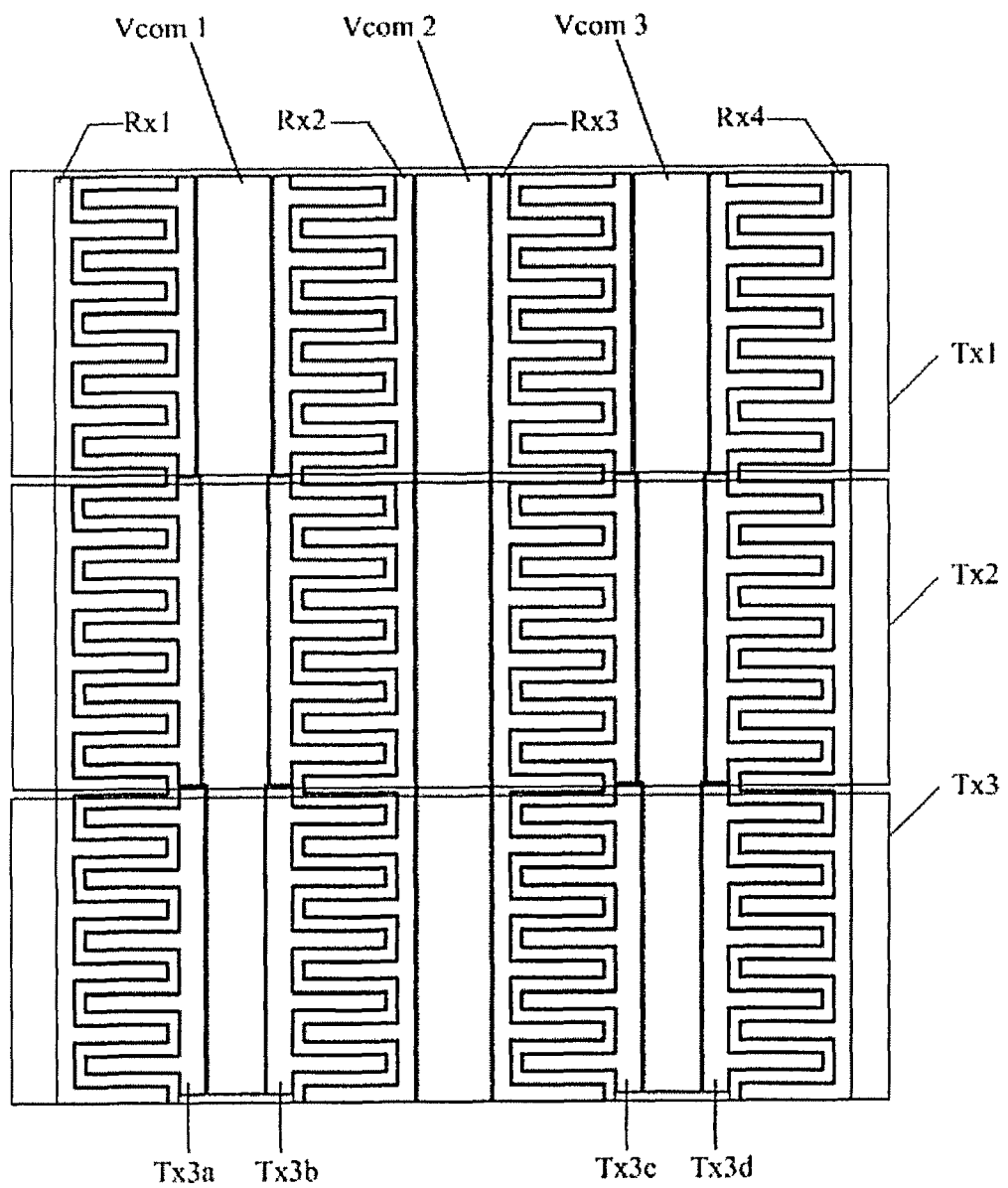

For example, the touch driving electrodes and the touch sensing electrodes disposed in the common electrode layer may have a strip electrode structure, a diamond electrode structure or an interleaved-finger electrode array structure (as illustrated in FIGS. 2a and 2b). The touch sensing electrode Rx is illustrated in FIGS. 2a and 2b as being wired along a vertical direction in the drawing, and the touch driving electrode Tx is wired along a horizontal direction in the drawing. Since the touch sensing electrode Rx and the touch driving electrode Tx are disposed in the same layer, a plurality of touch driving sub-electrodes that constitute one touch driving electrode Tx are insulated with each other. In the interleaved-finger electrode structure as illustrated in FIG. 2a, six (6) touch driving sub-electrodes Tx1a, Tx1b, Tx1c, Tx1d, Tx1e, Tx1f constitute one touch driving electrode Tx1, and they are connected to the same signal input terminal of the driving chip (IC) to realize lateral connection. Six (6) touch driving sub-electrodes Tx2a, Tx2b, Tx2c, Tx2d, Tx2e, Tx2f constitute one touch driving electrode Tx2, and similarly they are connected to the same signal input terminal of the driving chip (IC) to realize lateral connection. Six (6) touch driving sub-electrodes Tx3a, Tx3b, Tx3c, Tx3d, Tx3e, Tx3f constitute one touch driving electrode Tx3, and similarly they are connected to the same signal input terminal of the driving chip (IC) to realize lateral connection.

In the interleaved-finger electrode structure as illustrated in FIG. 2b, four (4) touch driving sub-electrodes Tx3a, Tx3b, Tx3c, and Tx3d constitute one touch driving electrode Tx3, and the touch driving electrode Tx1 and Tx2 have the same structure as Tx3. It is possible to connect touch driving sub-electrodes that constitute the same one touch driving electrode Tx by a metal bridge and then a signal line is used to input a touch scan signal to them. It is also possible to dispose signal lines for touch driving sub-electrodes that constitute the same one touch driving electrode respectively to input touch scan signals to them, which is not limited here.

Preferably, when the touch driving electrodes and the touch sensing electrodes adopt the interleaved-finger electrode array structure design, compared with a strip electrode structure and a diamond electrode structure, this interleaved-finger electrode array structure can increase mutual inductive capacitance between touch sensing electrodes and touch driving electrodes, hence increasing sensitivity and accuracy of touch control.

Furthermore, as illustrated in FIGS. 2a and 2b, since the precision of a touch panel is generally on the order of millimeter, while the precision of liquid crystal display is generally on the order of microns, when the touch sensing electrodes and the touch driving electrodes are disposed, there may be gaps covering several columns or several rows of pixel units between them. Thus, as illustrated in FIG. 2b, common electrodes may be further disposed in the gaps between touch sensing electrodes and touch driving electrodes of the common electrode layer. For example, the common electrodes comprise the electrodes Vcom1, Vcom2, Vcom3, Vcom4, Vcom5, Vcom6, and Vcom7 as illustrated in FIG. 2b. The common electrodes are insulated with the touch sensing electrodes and the touch driving electrodes. The common electrodes are input with a common electrode signal in operation to ensure pixel units in the regions corresponding to the common electrodes can normally display.

Figures 3, 4A:
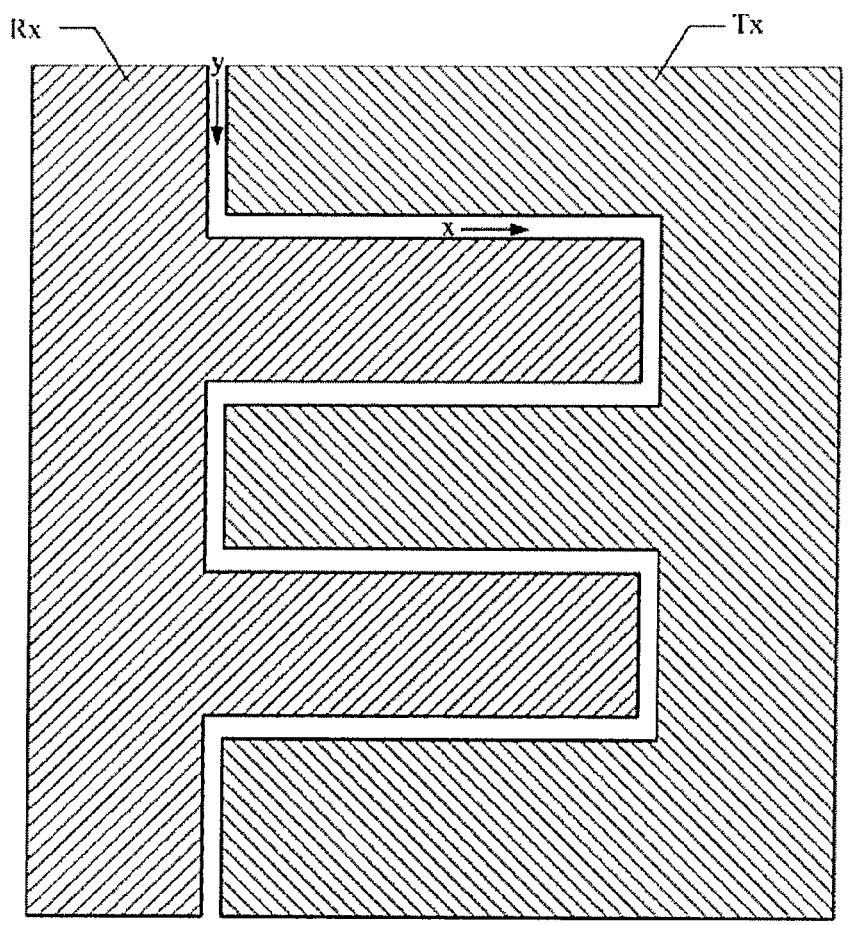
FIG. 3 is a structural representation of the partitioning gap between touch driving electrodes and touch sensing electrodes in the touch panel provided in an embodiment of the present disclosure.
FIGS. 4a and 4b are side views at the cutting gap in X direction and Y direction between touch driving electrodes and touch sensing electrodes in the touch panel.
Figure 4B:
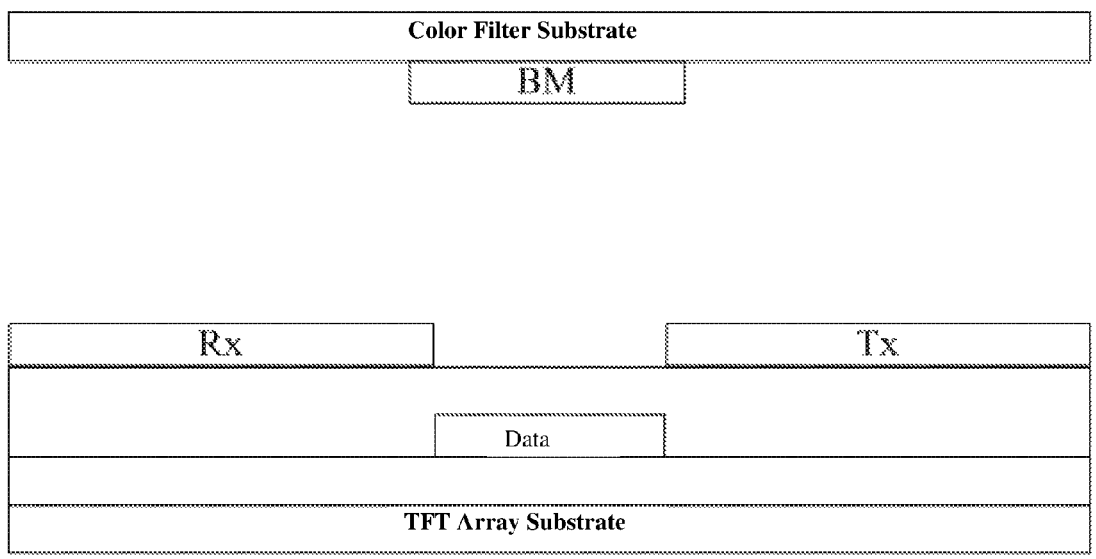

For example, when the common electrode layer is partitioned into touch driving electrodes and touch sensing electrodes, the partitioning process is conducted along the gaps between pixel units of adjacent rows and the gaps between pixel units of adjacent columns, as illustrated in FIG. 3, that is, the partitioning gaps of the common electrode layer include X direction (corresponding to gaps between pixel units of adjacent rows) and Y direction (corresponding to gaps between pixel units of adjacent columns). As illustrated in FIG. 4a, the black matrix (BM) in X direction of the color filter substrate corresponding to the partitioning gaps in X direction is relatively wider, generally larger than 15 μm. If the partitioning gaps in X direction are disposed in accordance with a cutting width of 6 μm, when the signal applied over the gate signal lines "Gate" under the partitioning gaps in X direction influences the upper horizontal electric field via the gaps, the black matrix in X direction on the color filter substrate can shield the abnormal display occurrence resulted from it, and no bad influence will be incurred to the liquid crystal display. However, as illustrated in FIG. 4b, the black matrix (BM) in Y direction of the color filter substrate corresponding to partitioning gaps in Y direction is relatively narrower, typically on the order of 6 μm. Even if the partitioning gaps in Y direction are disposed in accordance with a cutting width of 6 μm, when the signal applied over the data signal lines "Data" under the partitioning gaps in Y direction influences the upper horizontal electric field via the gaps, since there is a ±2 μm tolerance for cell-assembling of the color filter substrate and the TFT array substrate, the black matrix in Y direction on the color filter substrate may not completely shield the abnormal display occurrence resulted from it, which will result in abnormal display of the touch panel.

Figure 5:
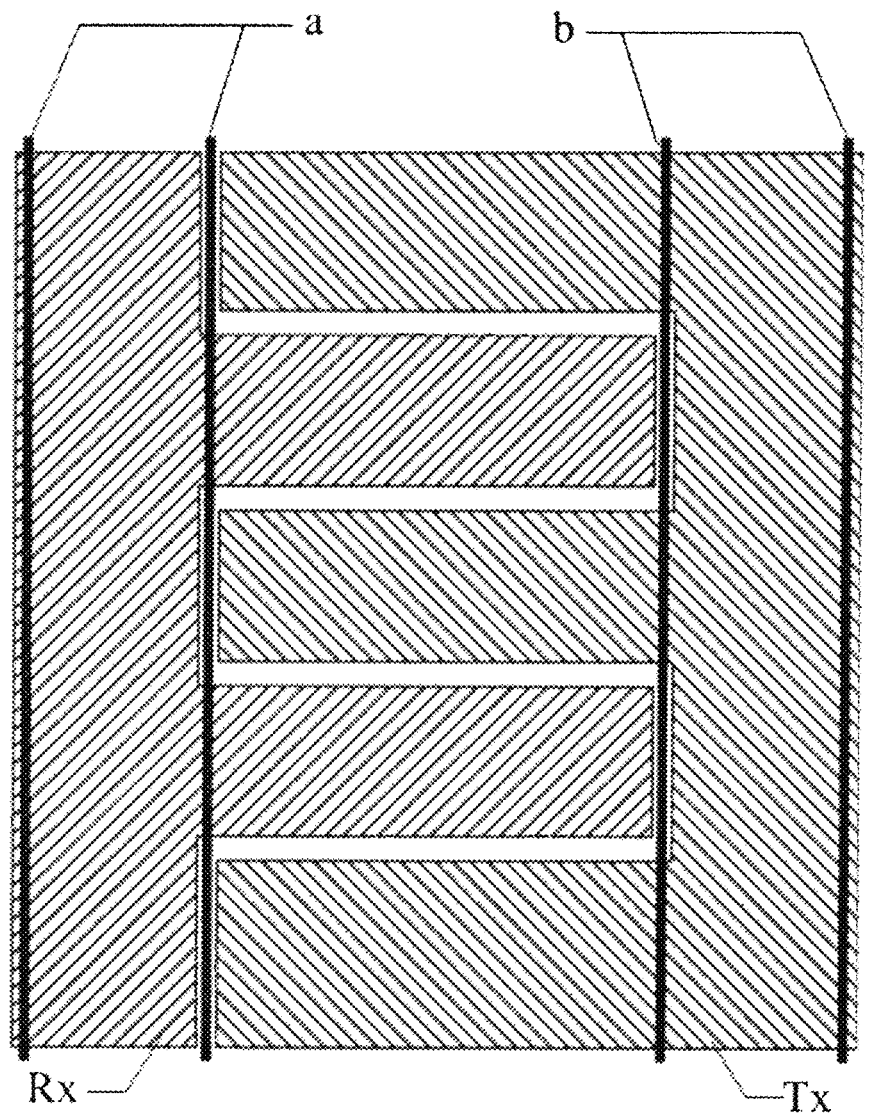
FIG. 5 is a schematic diagram of the pattern of a first metal driving electrode and a first metal inductive electrode in the touch panel provided in an embodiment of the present disclosure.
Figure 6:
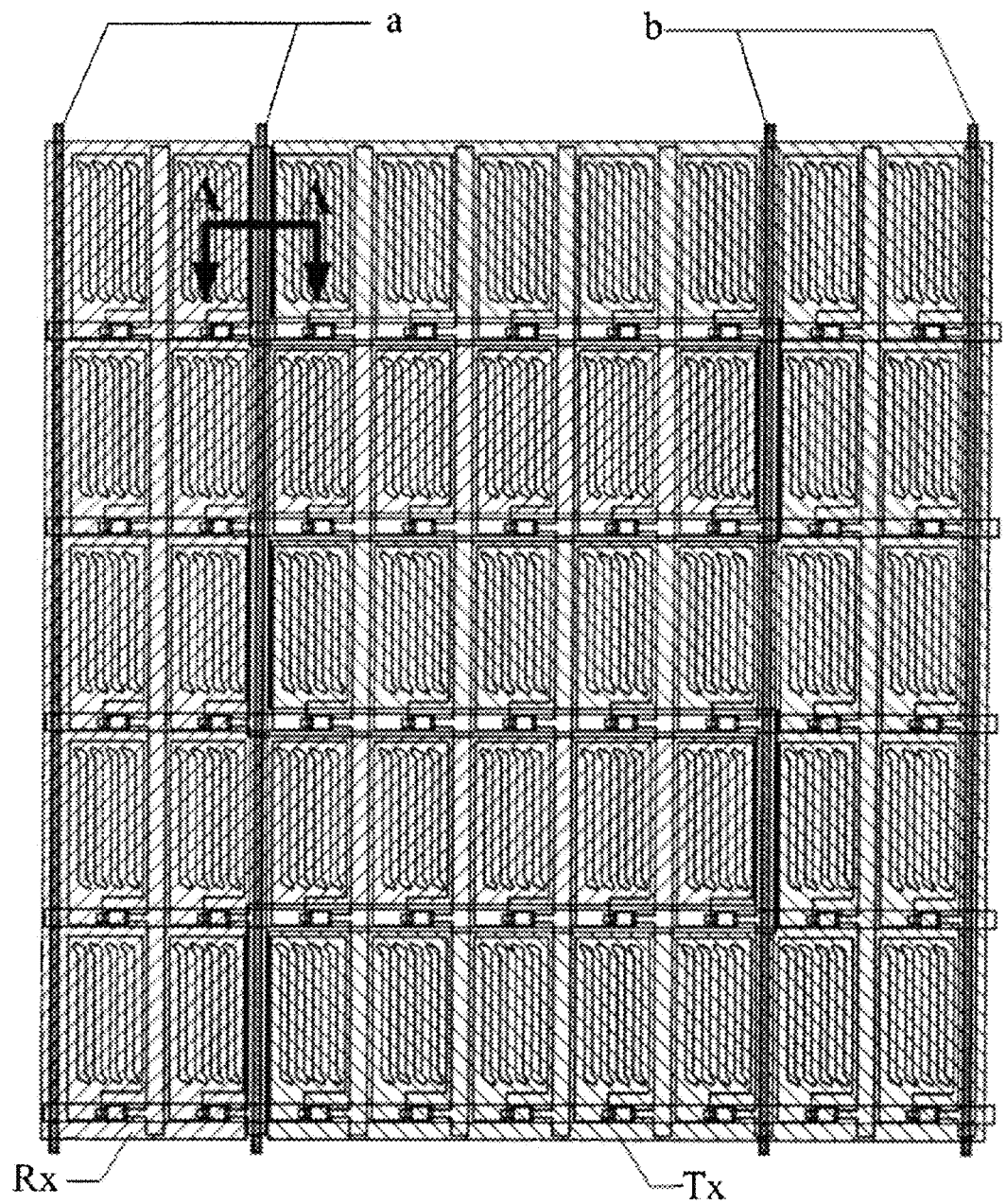
FIG. 6 is a top view of the TFT array substrate in the touch panel provided in an embodiment of the present disclosure.

In the touch panel provided in embodiments of the present disclosure, as illustrated in FIGS. 5 and 6, a first metal driving electrode "b" and/or a first metal inductive electrode "a" may be further disposed over the data signal lines and between pixel units of adjacent columns. The first metal driving electrode "b" and the first metal inductive electrode "a" can shield the partitioning gaps over data signal lines between touch sensing electrodes Rx and touch driving electrodes Tx, namely partitioning gaps in Y direction. The signal applied on the data signal lines may influence the horizontal electric field over the TFT array substrate via the partitioning gaps, thereby influencing the normal display of the liquid crystal panel, while the black matrix of the color filter substrate over the data signal lines may be too narrow to shield this part of liquid crystal that displays abnormally, thereby leading to abnormal display problem of the touch panel. Provision of the above-mentioned metal electrodes "a" and "b" can avoid or mitigate this problem.

For example, the first metal driving electrodes may be located on a layer above or under the touch driving electrodes and electrically connected with corresponding touch driving electrodes directly. The first metal driving electrodes may also be electrically connected with corresponding touch driving electrodes through via holes, which is not limited here. Similarly, the first metal inductive electrodes may be located on a layer above or under the touch sensing electrodes and electrically connected with corresponding touch sensing electrodes directly. First metal inductive electrodes may also be electrically connected with corresponding touch sensing electrodes through via holes, which is not limited here.

Further, since common electrode layer is generally formed of ITO material with high resistance, after the first metal driving electrodes formed of metal are electrically connected with corresponding touch driving electrodes, it is equivalent to connecting the ITO electrode with a plurality of metal conductors in parallel, which can reduce the resistance of touch driving electrodes as much as possible, hence improving SNR when the touch driving electrodes are transmitting signals. Similarly, after the first metal inductive electrodes formed of metal are electrically connected with corresponding touch sensing electrodes, it is equivalent to connecting the ITO electrodes with a plurality of metal conductors in parallel, which can also reduce the resistance of touch sensing electrodes as much as possible, hence improving SNR when the touch sensing electrodes are transmitting signals.

Figure 9:
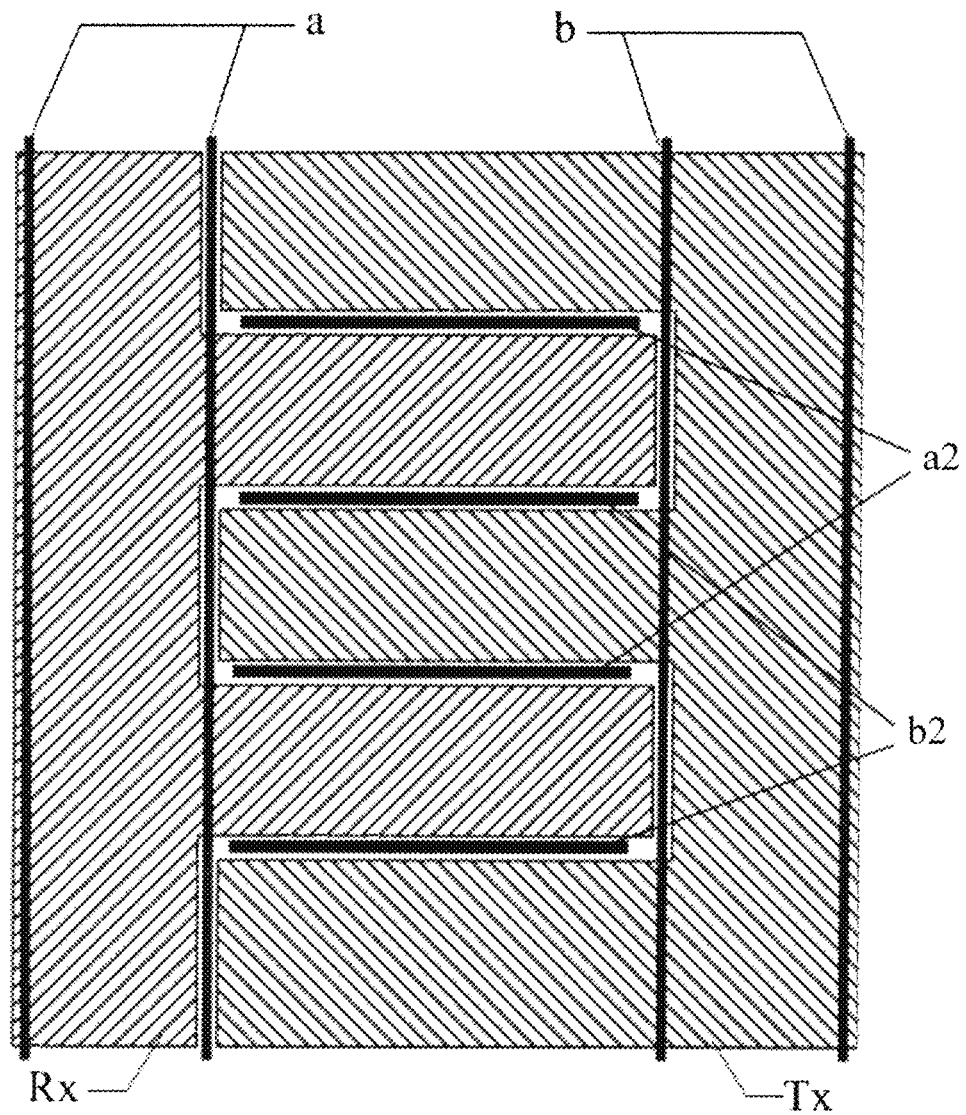
FIG. 9 is a schematic diagram of the pattern of a second metal driving electrode and a second metal inductive electrode in the touch panel provided in an embodiment of the present disclosure.

For example, as illustrated in FIG. 9, in order to further reduce the resistance of touch driving electrodes and touch sensing electrodes, it is also possible to dispose second metal driving electrodes "a2" and/or second metal inductive electrodes "b2" over the gate signal lines of the TFT array substrate and between pixel units of adjacent rows, that is, the second metal driving electrodes and the second metal inductive electrodes shield the partitioning gaps between the touch sensing electrodes and the touch driving electrodes and over the gate signal lines, i.e., the partitioning gaps in X direction. The second metal driving electrodes and corresponding touch driving electrodes are connected electrically, and the second metal inductive electrodes and corresponding touch sensing electrodes are connected electrically, in order to decrease the resistance of the touch driving electrodes and the touch sensing electrodes. The second metal driving electrodes "a2" and the second metal inductive electrodes "b2" may be located on the same layer with the first metal driving electrodes "a" and the first metal inductive electrodes "b," therefore the second metal driving electrodes "a2" and the second metal inductive electrodes "b2" are formed segment by segment so as to not intersect with the first metal driving electrodes "a" and the first metal inductive electrodes "b."

Furthermore, for example, the TFT array substrate may further be provided with first transparent conducting electrodes electrically connected with the first metal inductive electrodes and/or second transparent conducting electrodes electrically connected with the first metal touch electrodes. The first transparent conducting electrodes and the second transparent conducting electrodes may be electrodes formed of such as ITO material. Thus, the first transparent conducting electrodes and the second transparent conducting electrodes may further reduce the influence by the data signal lines on the horizontal electric field via the partitioning gaps in Y direction.

Figure 7:
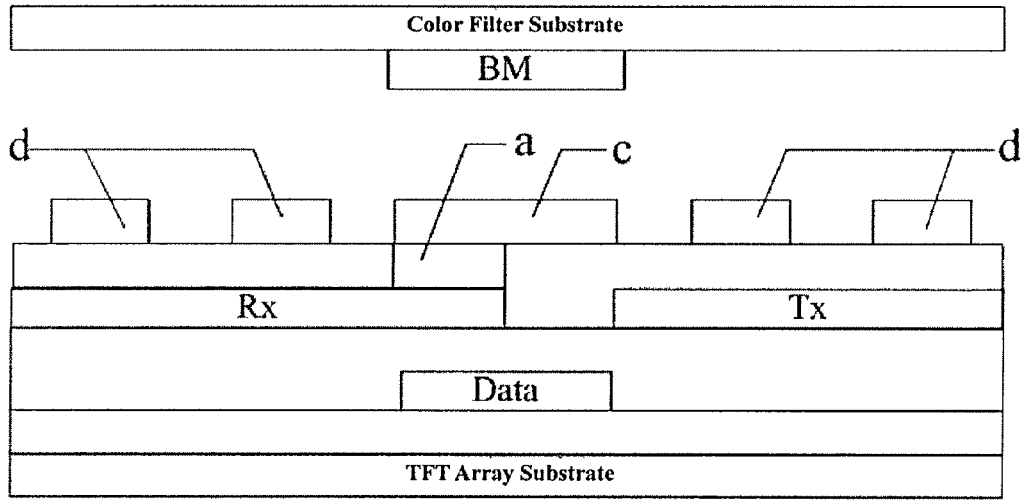
FIG. 7 is a side view along line A-A in FIG. 6.

For example, if in one example, the TFT array substrate comprises pixel electrodes over the common electrode layer, and the connection between pixel electrodes and thin film transistors is implemented with through holes in the common electrode layer. The TFT array substrate may still have the plan view illustrated in FIG. 6. The sectional view along line A-A in FIG. 6 is illustrated in FIG. 7. As illustrated in FIG. 7, the first transparent conducting electrodes "c" and/or the second transparent conducting electrodes (not shown in this sectional view) may be disposed in the same layer as the pixel electrode d and insulated with the pixel electrodes d. Thus, while manufacturing the TFT array substrate, no additional process are needed, only one patterning process is needed to form patterns of the first transparent conducting electrodes c, the second transparent conducting electrodes and the pixel electrodes d, which can save manufacturing costs and improve values of products.

Furthermore, in the above-mentioned touch panel provided in embodiments of the present disclosure, the touch phase and the display phase are driven in a time-division manner which can integrate chips for display driving and touch driving to further reduce the production costs and on the other hand can reduce mutual interference of the display operation and the touch operation and improve picture quality and touch accuracy.

Figure 8:
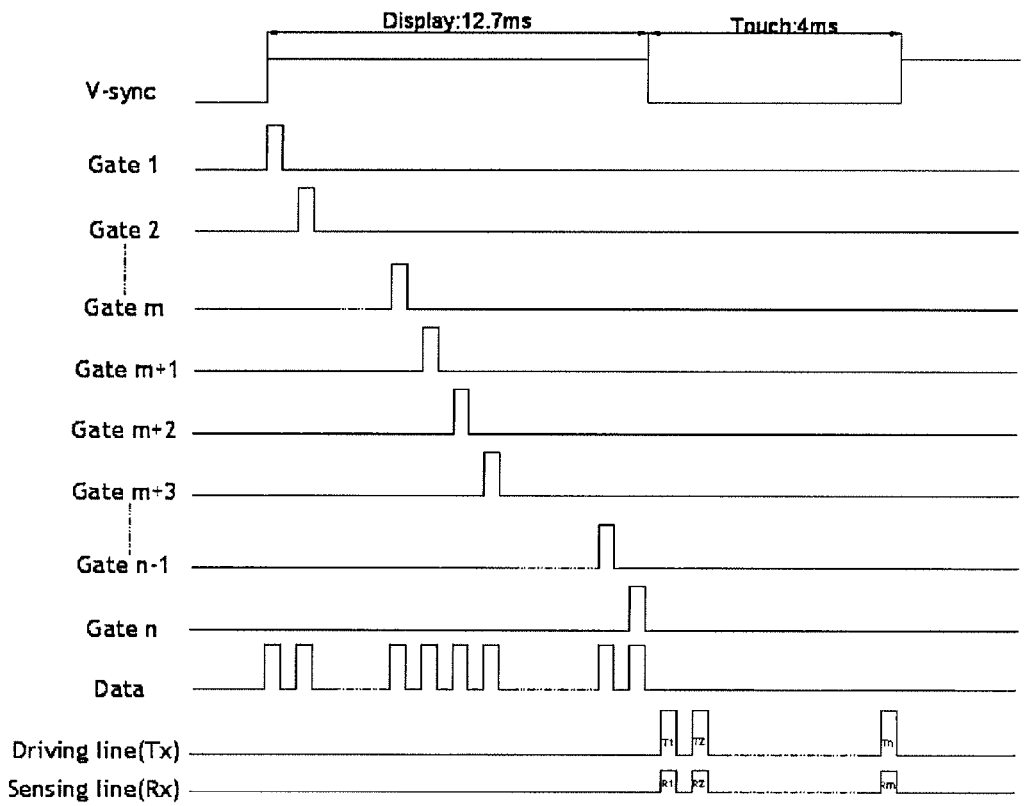
FIG. 8 is a schematic diagram of the driving time sequence of the capacitive in-cell touch panel provided in an embodiment of the present disclosure.

For example, in the driving timing sequence diagram as illustrated in FIG. 8, the period of each frame (V-sync) displayed by the touch panel is divided into an display period (Display) and a touch control period (Touch). For example, the time for the touch panel to display one frame is 16.7 ms, 4 ms of which is selected as touch control period, and the remaining 12.7 ms as display period. Of course, the durations of the two periods may be adjusted appropriately according to the processing capacity of IC chips, which is not limited here. In the display period (Display), the gate scan signals are applied sequentially on each gate signal lines Gate 1, Gate 2 . . . Gate n in the touch panel, a gray scale signal is applied on each data signal line "Data." Accordingly, at this point, the touch driving electrode Tx functions as the common electrode and is provided with a common electrode signal, which may be constant, by an IC chip connected with it to implement liquid crystal display function. In the touch control period (Touch), the IC chip connected with the touch driving electrode Tx provides touch scan signals T1, T2, . . . Tn to touch driving electrodes Tx respectively, and at the same time the touch sensing electrodes Rx sense the touch inductive signals R1, R2, . . . Rm respectively to realize touch control function. In the touch control period, no signal is input into the gate signal lines and the data signal lines in the display panel.

Another embodiment of the present disclosure further provides a display device including the above-mentioned capacitive in-cell touch panel provided in any of the embodiments of the present disclosure. The above-mentioned embodiments of the in-cell touch panel may be referred to for the implementation of this display device and repetition will not be described any more.

In the capacitive in-cell touch panel and the display device provided in the embodiments of the present disclosure, the common electrode layer electrically connected over the entire surface of the TFT array substrate is partitioned to form touch sensing electrodes and touch driving electrodes insulated with each other, the partitioning gaps between the touch sensing electrodes and the touch driving electrodes are opposite to the gaps between pixel units of adjacent rows and adjacent columns. The touch driving electrodes and the touch sensing electrodes are driven in a time-division manner to realize touch function and display function. Since the touch panel provided in any of the embodiments of the present disclosure can realize the touch function by modifying the common electrode layer structure of the traditional TFT array substrate, no additional process is required to fabricate a touch panel on the basis of the traditional manufacturing process of TFT array substrate, which saves the production costs and enhances the production efficiency. Further, since the touch and display functions are driven in a time-division manner, it can also reduce mutual interference and improve picture quality.

Furthermore, in the touch panel provided in an embodiment of the present disclosure, a first metal driving electrode and/or a first metal inductive electrode may be disposed over the data signal lines and between pixel units of adjacent columns. The first metal driving electrode and the first metal inductive electrode can shield the partitioning gaps over data signal lines between touch sensing electrodes and touch driving electrodes to avoid the problem in which the signals applied on the data signal lines influence the horizontal electric field over the TFT array substrate via the partitioning gaps, thereby influencing normal display of the liquid crystal, while the black matrix of the color filter substrate over the data signal lines may be too narrow to shield the part of liquid crystal that display abnormally, thereby leading to abnormal display of the touch panel.

The embodiment of the disclosure being thus described, it will be obvious that the same may be varied in many ways. Such variations are not to be regarded as a departure from the spirit and scope of the disclosure, and all such modifications as would be obvious to those skilled in the art are intended to be included within the scope of the following claims.

What is claimed is:

1. A capacitive in-cell touch panel comprising a thin film transistor (TFT) array substrate having gate signal lines, data signal lines and a common electrode layer, the common electrode layer being over the gate signal lines and the data signal lines, and the TFT array substrate comprising a plurality of pixel units arranged in matrix, wherein the common electrode layer comprises touch sensing electrodes and touch driving electrodes insulated with each other, and partitioning gaps between the touch sensing electrodes and the touch driving electrodes are opposite to gaps between pixel units of adjacent rows and adjacent columns; in a display period, the touch driving electrodes and the touch sensing electrodes are applied with a common electrode signal; and in a touch control period, the touch driving electrodes are applied with a touch scan signal and the touch sensing electrodes are used to couple with and output a voltage signal of the touch scan signal;

wherein the TFT array substrate comprises first metal driving electrodes and/or first metal inductive electrodes over the data signal lines and between pixel units of adjacent columns, the first metal driving electrodes are electrically connected with corresponding touch driving electrodes, and the first metal inductive electrodes are electrically connected with corresponding touch sensing electrodes;

wherein the touch panel further comprises first transparent conducting electrodes electrically connected with the first metal inductive electrodes and/or second transparent conducting electrodes electrically connected with the first metal driving electrodes; and wherein the touch panel further comprises pixel electrodes over the common electrode layer, and the first transparent conducting electrodes and/or the second transparent conducting electrodes are disposed on the same layer with the pixel electrodes and insulated with each other.

2. The touch panel of claim 1, wherein the first metal driving electrode are located on a layer above or under the touch driving electrodes; and the first metal inductive electrodes are located on a layer above or under the touch sensing electrodes.

3. The touch panel of claim 1, further comprising: second metal driving electrodes and/or second metal inductive electrodes over gate signal lines in the TFT array substrate and between pixel units of adjacent rows;

wherein the second metal driving electrodes are electrically connected with corresponding touch driving electrodes, and the second metal inductive electrodes are electrically connected with corresponding touch sensing electrodes.

4. The touch panel of claim 1, wherein the touch driving electrodes extend along a row direction of the pixel units, and the touch sensing electrodes extend along a column direction of the pixel units; or the touch driving electrodes extend along a column direction of the pixel units, and the touch sensing electrodes extend along a row direction of the pixel units.

5. The touch panel of claim 4, wherein the touch driving electrodes and the touch sensing electrodes have a strip electrode structure, a diamond electrode structure or an interleaved-finger electrode array structure.

6. The touch panel of claim 5, further comprising: common electrodes in gaps between the touch sensing electrodes and the touch driving electrodes of the common electrode layer, the common electrodes being insulated with the touch sensing electrodes and the touch driving electrodes.

7. A display device comprising a capacitive in cell touch panel of claim 1.

8. The touch panel of claim 1, wherein the first metal driving electrodes and/or the first metal inductive electrodes are formed over the data signal lines and the gate signal lines as well as the common electrode layer, and the first metal driving electrodes and/or the first metal inductive electrodes shield the partitioning gaps over the data signal lines.

9. A capacitive in-cell touch panel comprising a thin film transistor (TFT) array substrate having gate signal lines, data signal lines and a common electrode layer, the common electrode layer being over the gate signal lines and the data signal lines, and the TFT array substrate comprising a plurality of pixel units arranged in matrix, wherein the common electrode layer comprises touch sensing electrodes and touch driving electrodes insulated with each other, and partitioning gaps between the touch sensing electrodes and the touch driving electrodes are opposite to gaps between pixel units of adjacent rows and adjacent columns; in a display period, the touch driving electrodes and the touch sensing electrodes are applied with a common electrode signal; and in a touch control period, the touch driving electrodes are applied with a touch scan signal and the touch sensing electrodes are used to couple with and output a voltage signal of the touch scan signal;

wherein the TFT array substrate comprises first metal driving electrodes and/or first metal inductive electrodes over the data signal lines and between pixel units of adjacent columns, the first metal driving electrodes are electrically connected with corresponding touch driving electrodes, and the first metal inductive electrodes are electrically connected with corresponding touch sensing electrodes;

wherein the touch panel further comprises second metal driving electrodes and/or second metal inductive electrodes over gate signal lines in the TFT array substrate and between pixel units of adjacent rows; and wherein the second metal driving electrodes are electrically connected with corresponding touch driving electrodes, and the second metal inductive electrodes are electrically connected with corresponding touch sensing electrodes.

10. The touch panel of claim 9, wherein the first metal driving electrodes are located on a layer above or under the touch driving electrodes; and the first metal inductive electrodes are located on a layer above or under the touch sensing electrodes.

11. The touch panel of claim 9, wherein the touch driving electrodes extend along a row direction of the pixel units, and the touch sensing electrodes extend along a column direction of the pixel units; or the touch driving electrodes extend along a column direction of the pixel units, and the touch sensing electrodes extend along a row direction of the pixel units.

12. The touch panel of claim 11, wherein the touch driving electrodes and the touch sensing electrodes have a strip electrode structure, a diamond electrode structure or an interleaved-finger electrode array structure.

13. The touch panel of claim 12, further comprising: common electrodes in gaps between the touch sensing electrodes and the touch driving electrodes of the common electrode layer, the common electrodes being insulated with the touch sensing electrodes and the touch driving electrodes.

14. The touch panel of claim 9, wherein the first metal driving electrodes and/or the first metal inductive electrodes are formed over the data signal lines and the gate signal lines as well as the common electrode layer, and the first metal driving electrodes and/or the first metal inductive electrodes shield the partitioning gaps over the data signal lines.

15. A display device comprising the capacitive in cell touch panel of claim 9.

16. A capacitive in-cell touch panel comprising a thin film transistor (TFT) array substrate having gate signal lines, data signal lines and a common electrode layer, the common electrode layer being over the gate signal lines and the data signal lines, and the TFT array substrate comprising a plurality of pixel units arranged in matrix, wherein the common electrode layer comprises touch sensing electrodes and touch driving electrodes insulated with each other, and partitioning gaps between the touch sensing electrodes and the touch driving electrodes are opposite to gaps between pixel units of adjacent rows and adjacent columns; in a display period, the touch driving electrodes and the touch sensing electrodes are applied with a common electrode signal; and in a touch control period, the touch driving electrodes are applied with a touch scan signal and the touch sensing electrodes are used to couple with and output a voltage signal of the touch scan signal;

wherein the TFT array substrate comprises first metal driving electrodes and/or first metal inductive electrodes over the data signal lines and between pixel units of adjacent columns, the first metal driving electrodes are electrically connected with corresponding touch driving electrodes, and the first metal inductive electrodes are electrically connected with corresponding touch sensing electrodes; and wherein the first metal driving electrodes and/or the first metal inductive electrodes are formed over the data signal lines and the gate signal lines as well as the common electrode layer, and the first metal driving electrodes and/or the first metal inductive electrodes shield the partitioning gaps over the data signal lines.

17. The touch panel of claim 16, wherein the first metal driving electrodes are located on a layer above or under the touch driving electrodes; and the first metal inductive electrodes are located on a layer above or under the touch sensing electrodes.

18. The touch panel of claim 16, wherein the touch driving electrodes extend along a row direction of the pixel units, and the touch sensing electrodes extend along a column direction of the pixel units; or the touch driving electrodes extend along a column direction of the pixel units, and the touch sensing electrodes extend along a row direction of the pixel units.

19. The touch panel of claim 18, wherein the touch driving electrodes and the touch sensing electrodes have a strip electrode structure, a diamond electrode structure or an interleaved-finger electrode array structure.

20. The touch panel of claim 19, further comprising: common electrodes in gaps between the touch sensing electrodes and the touch driving electrodes of the common electrode layer, the common electrodes being insulated with the touch sensing electrodes and the touch driving electrodes.

* * * * *